(12) United States Patent
Kim et al.

(10) Patent No.: US 8,356,225 B2
(45) Date of Patent: Jan. 15, 2013

(54) DATA DERATE MATCHER FOR SUPPORTING HARQ AND METHOD THEREOF

(75) Inventors: Nam Il Kim, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 12/841,670

(22) Filed: Jul. 22, 2010

(65) Prior Publication Data

US 2011/0145669 A1    Jun. 16, 2011

(30) Foreign Application Priority Data

Dec. 15, 2009    (KR) .......................... 10-2009-0124941

(51) Int. Cl.
*G06F 11/00* (2006.01)
(52) U.S. Cl. .......................... 714/748; 370/315; 714/751
(58) Field of Classification Search .................. None
See application file for complete search history.

(56) References Cited

U.S. PATENT DOCUMENTS

| | | | |
|---|---|---|---|
| 7,792,022 B2* | 9/2010 | Cho et al. ...................... | 370/229 |
| 8,121,096 B2* | 2/2012 | Choi et al. .................... | 370/335 |
| 2005/0172201 A1* | 8/2005 | Kutz et al. ..................... | 714/755 |
| 2005/0201283 A1 | 9/2005 | Yoon et al. | |
| 2006/0150051 A1 | 7/2006 | Kwon et al. | |
| 2007/0189248 A1* | 8/2007 | Chang et al. .................. | 370/338 |
| 2009/0028129 A1* | 1/2009 | Pi et al. ........................ | 370/351 |

FOREIGN PATENT DOCUMENTS

KR    1020050087892    9/2005

* cited by examiner

*Primary Examiner* — Scott Baderman
*Assistant Examiner* — Jason Bryan
(74) *Attorney, Agent, or Firm* — Nelson Mullins Riley & Scarborough LLP; EuiHoon Lee, Esq.

(57) ABSTRACT

A data derate matcher for supporting hybrid automatic repeat request (HARQ), includes a control parameter generation unit for generating control parameters to separate bits of an input bit stream $e_k$; and a bit separation unit for separating the bits of the input bit stream $e_k$ into three types of bits streams $v^{(0)}k$, $v^{(1)}k$, and $v^{(2)}k$ by modulus operation of each of the bits of the input bit stream and the control parameters. Further, the data derate matcher for supporting the HARQ includes address generators for generating addresses (j) of valid data to be used in deinterleavers with respect to data of each of the bit streams output from the bit separation unit; and subblock deinterleavers for sequentially inputting data corresponding to the addresses generated by the address generators to output decoded data.

20 Claims, 3 Drawing Sheets

DATA DERATE MATCHER FOR SUPPORTING HARQ AND METHOD THEREOF

CROSS-REFERENCE TO RELATED APPLICATIONS

The present invention claims priority to Korean Patent Application No. 10-2009-0124941 filed on Dec. 15, 2009, which is incorporated herein by reference.

FIELD OF THE INVENTION

The present invention relates to the transmission of hybrid automatic repeat request (HARQ) in 3rd generation partnership project (3GPP) long term evolution (LTE) and 3GPP LTE advanced systems, and more particularly, to a data derate matcher that supports HARQ to perform more efficient derate matching in channel decoding of received data for the transmission of HARQ, and a method of the same.

BACKGROUND OF THE INVENTION

Generally, at a transmitting end of a 3GPP LTE system, a data coding process involves turbo coding HARQ data to be transmitted and performing data rate matching by a rate matcher to match the length of turbo coded data with the length of data required for wireless transmission. At a receiving end, a data decoding process involves executing data derate matching by a derate matcher to match the length of received data in wireless transmission with the length of input data to a turbo decoder.

FIG. 1 shows the configuration of a rate matcher for turbo coded data in a 3GPP LTE system of related art.

As shown in FIG. 1, a turbo coding rate matcher 100 performs a function of matching the number of input bits to a channel encoder with a total number of bits mapped to a physical channel (e.g., PUSCH or PDSCH). The function of the rate matcher 100 is controlled by a redundancy version (rv) parameter of HARQ, where rv has one of 0, 1, 2, and 3.

Referring to FIG. 1, the rate matcher 100 for turbo coded data includes subblock interleavers 102, 104, and 106 for three information bit streams $d^{(0)}k$, $d^{(1)}k$, and $d^{(2)}k$, a buffer unit 108, and a bit selection unit 110.

Input bit streams $d^{(i)}k$ are passed to the subblock interleavers 102, 104, and 106 to create $v^{(i)}k$ (where $k=0, 1, \ldots, k_\Pi$), and interleaved data streams are temporarily stored in the buffer unit 108 and then certain bits are selected depending on the size of output bits by the bit selection unit 110 and output as a turbo coded bit stream $e_k$ (where i=0, 1, 2).

Hereinafter, the operation of each component will be described in more detail.

First, the operation of the subblock interleavers 102, 104, and 106 will be discussed in detail.

Input bits of the subblock interleavers 102, 104, and 106: $d^{(i)}0, d^{(i)}1, d^{(i)}2, \ldots, d^{(i)}D-1$ where D is the number of input bits and i=0, 1, and 2.

Output bits of the subblock interleavers: $v^{(i)}0, v^{(i)}1, v^{(i)}2, \ldots v^{(i)}K_\Pi-1$, where $K_\Pi$ will be defined below and i=0, 1, and 2.

Output bit sequences of the subblock interleavers are derived as follows:

(1) Number of matrix columns to be assigned: $C_{subblock}=32$, and the number of matrix columns: 0, 1, 2, \ldots, $C_{subblock-1}$ from left to right.

(2) Calculation of minimum integer $R_{subblock}$ satisfying the following condition: $D \leq (R_{subblock} \times C_{subblock})$, and rectangular matrix row number: 0, 1, 2, \ldots, $R_{subblock-1}$ from top to bottom.

(3) If $(R_{subblock} \times C_{subblock}) > D$, then dummy bits, $N_D = (R_{subblock} \times C_{subblock} - D)$, are added. That is, $Y_k = <NULL>$ (where $k=0, 1, \ldots, N_D-1$) and the input bit sequence is written in the $(R_{subblock} \times C_{subblock})$ matrix as in the following Eq. (1).

In other words, $y_{ND+k} = d^{(i)}k$ (where $k=0, 1, \ldots, D-1$). At this point, bit $y_0$ in 0th row and 0th column starts and then it continues row by row.

[Equation 1]
$$\begin{bmatrix} y_0 & y_1 & y_2 & \cdots & y_{C_{subblock}-1} \\ y_{C_{subblock}} & y_{C_{subblock}+1} & y_{C_{subblock}+2} & \cdots & y_{2C_{subblock}-1} \\ \vdots & \vdots & \vdots & \vdots & \vdots \\ y_{(R_{subblock}-1) \times C_{subblock}} & y_{(R_{subblock}-1) \times C_{subblock}+1} & y_{(R_{subblock}-1) \times C_{subblock}+2} & \cdots & y_{(R_{subblock} \times C_{subblock}-1)} \end{bmatrix}$$

In case of $d^{(0)}k$ and $d^{(1)}k$:

(4) Based on $<P(j)>_{j \in \{0, 1, \ldots, C_{subblock}-1\}}$ in Table 1 below, the inter-column permutation of the matrix is carried out.

Here, P(j) represents the original column position of a j-th permutated column. After column permutation, inter-column permutated $(R_{subblock} \times C_{subblock})$ matrix is as follows:

[Equation 2]
$$\begin{bmatrix} y_{P(0)} & y_{P(1)} & y_{P(2)} & \cdots & y_{P(C_{subblock}-1)} \\ y_{P(0)+C_{subblock}} & y_{P(1)+C_{subblock}} & y_{P(2)+C_{subblock}} & \cdots & y_{P(C_{subblock}-1)+C_{subblock}} \\ \vdots & \vdots & \vdots & \vdots & \vdots \\ y_{P(0)+(R_{subblock}-1) \times C_{subblock}} & y_{P(1)+(R_{subblock}-1) \times C_{subblock}} & y_{P(2)+(R_{subblock}-1) \times C_{subblock}} & \cdots & y_{P(C_{subblock}-1)+(R_{subblock}-1) \times C_{subblock}} \end{bmatrix}$$

(5) Outputs of the subblock interleavers are created by reading the inter-column permutated $(R_{subblock} \times C_{subblock})$ matrix column by column. Bits after the subblock interleaving are $v^{(i)}0, v^{(i)}1, v^{(i)}2, \ldots, v^{(i)}K_\Pi-1$. Here, $v^{(i)}0$ is $y_P(0)$, $v^{(i)}1$ is $y_{P(0)+C_{subblock}}$, \ldots, and $K_\Pi = (R_{subblock} \times C_{subblock})$.

In case of $d^{(2)}k$:

(6) Outputs of the subblock interleavers are $v^{(i)}0, v^{(i)}1, v^{(i)}2, \ldots, v^{(i)}K_\Pi-1$. Here, $V^{(2)}k = y_{\pi(k)}$, and $$\pi(k) = \left[ p \left[ \frac{k}{R_{subblock}} \right] + C_{subblock} \times (k \bmod R_{subblock}) + 1 \right] \bmod K_\Pi.$$

TABLE 1

Inter-column permutation pattern of the subblock interleavers

| Number of columns $C_{subblock}$ | Inter-column permutation pattern $<P(0), P(1), \ldots, P(C_{subblock} - 1)>$ |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

Next, the operation of the buffer unit 108 and the bit selection unit 110 will be described in detail.

Generation of circular buffer having the length of $K_W = 3K_\Pi$:

$w_k = v_k^{(0)}$ for $k=0, \ldots, K_{\Pi-1}$ $w_{K_\Pi+2k} = v_k^{(1)}$ for $k=0, \ldots, K_{\Pi-1}$ $w_{K_\Pi+2k+1} = v_k^{(2)}$ for $k=0, \ldots, K_{\Pi-1}$ Rate matching output sequence length: E Soft buffer size: $N_{cb}$ (e.g., $N_{cb} = K_w$)

Rate matching output bit sequence: $e_k$ (where $k=0, 1, \ldots, E-1$)

HARQ redundancy version number: $rv_{idx}$ (where $rv_{idx}=0, 1, 2$ or $3$)

A start position $K_0$ of rate matcher bit selection is calculated as the following Equation 3:

$$k_0 = R_{subblock} \cdot \left[ 2 \cdot \left\lceil \frac{N_{Cb}}{8 R_{subblock}} \right\rceil \cdot rv_{idx} + 2 \right] \quad \text{[Equation 3]}$$

where $R_{subblock}$ is the number of rows.

In this manner, the transmission of output data from the rate matcher 100 for the selected bit data is made as the following Equation 4:

$$\begin{aligned}
&\text{Set } k = 0 \text{ and } j = 0 \quad \text{[Equation 4]}\\
&\text{while } \{k < E\}\\
&\quad \text{if } w_{(k0+j) \bmod Ncb} \neq \langle NULL \rangle\\
&\quad\quad e_k = w_{j \bmod Ncb}\\
&\quad\quad k = k + 1\\
&\quad \text{endif}\\
&\quad j = j + 1\\
&\text{endwhile}
\end{aligned}$$

As mentioned above, in the conventional rate matching process of the turbo coded data that supports HARQ, the dummy bits for an input data length D needs to be considered and the start position $K_0$ of the rate matcher for an HARQ redundancy version number rv needs also to be considered. Also, the transmission positions of a systematic data sequence S and parity data sequences P1 and P2 need to be considered.

However, the factors, such as the dummy bits and the redundancy version number rv start position $K_0$ considered in the conventional rate matching process of the turbo coded data that supports HARQ, also need to be taken into consideration in the derate matcher of the decoder of the receiving end. Therefore, the operation of the derate matcher is complicated, thus making the hardware configuration of the derate matcher complicated.

SUMMARY OF THE INVENTION

In view of the above, the present invention provides an efficient data derate matcher, which is adapted to input wirelessly received data to a turbo decoder in a data decoder, in the transmission and reception of turbo coded data that supports the HARQ function of the 3GPP LTE system, and a method of the same.

Further, the present invention provides a data derate matcher, which facilitates hardware implementation by simplifying a data processor based on a value of HARQ redundancy version number rv, without needing additional processing time taken for dummy bits required for operating the subblock interleaver of the derate matcher, and a method of the same.

In accordance with a first aspect of the present invention, there is provided a data derate matcher for supporting hybrid automatic repeat request (HARQ), including: a control parameter generation unit for generating control parameters to separate bits of an input bit stream $e_k$; a bit separation unit for separating the bits of the input bit stream $e_k$ into three types of bits streams $v^{(0)}k$, $v^{(1)}k$, and $v^{(2)}k$ by modulus operation of each of the bits of the input bit stream and the control parameters; address generators for generating addresses (j) of valid data to be used in deinterleavers with respect to data of each of the bit streams output from the bit separation unit; and subblock deinterleavers for sequentially inputting data corresponding to the addresses generated by the address generators to output decoded data.

In accordance with a second aspect of the present invention, there is provided a data derate matching method in a data derate matcher for supporting hybrid automatic repeat request (HARQ), including: generating control parameters to separate bits of an input bit stream $e_k$; separating the bits of the input bit stream $e_k$ into three types of bits streams $v^{(0)}k$, $v^{(1)}k$, and $v^{(2)}k$ by modulus operation of each of the bits of the input bit stream and the control parameters; generating addresses (j) of valid data to be used in deinterleavers with respect to data of each of the separated bit streams $v^{(0)}k$, $v^{(1)}k$, and $v^{(2)}k$; and sequentially inputting data corresponding to the generated addresses among the respective bit stream data to output decoded data.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
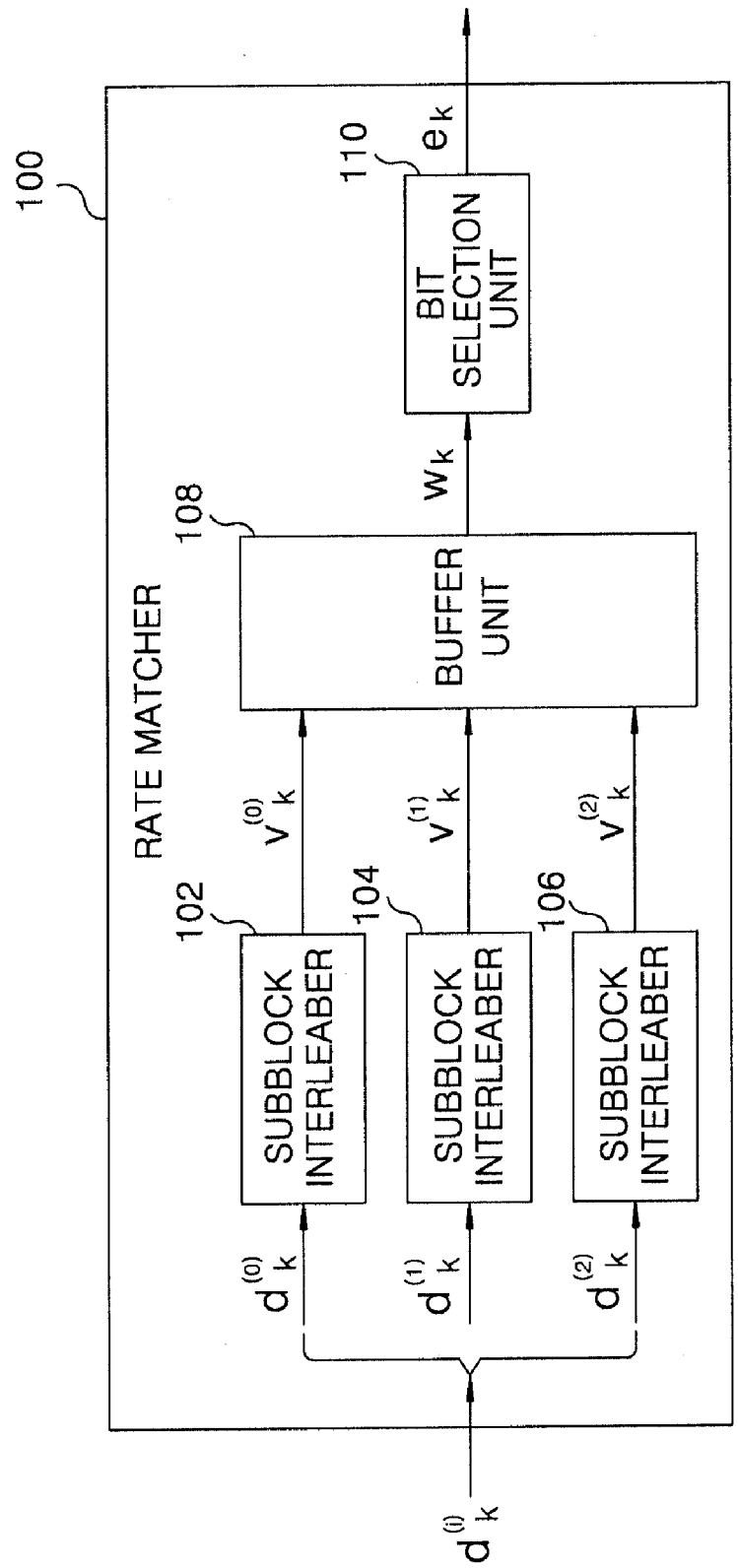
FIG. 1 shows a block diagram of a rate matcher for turbo coded data in a 3GPP LTE system of related art.
Figure 2:
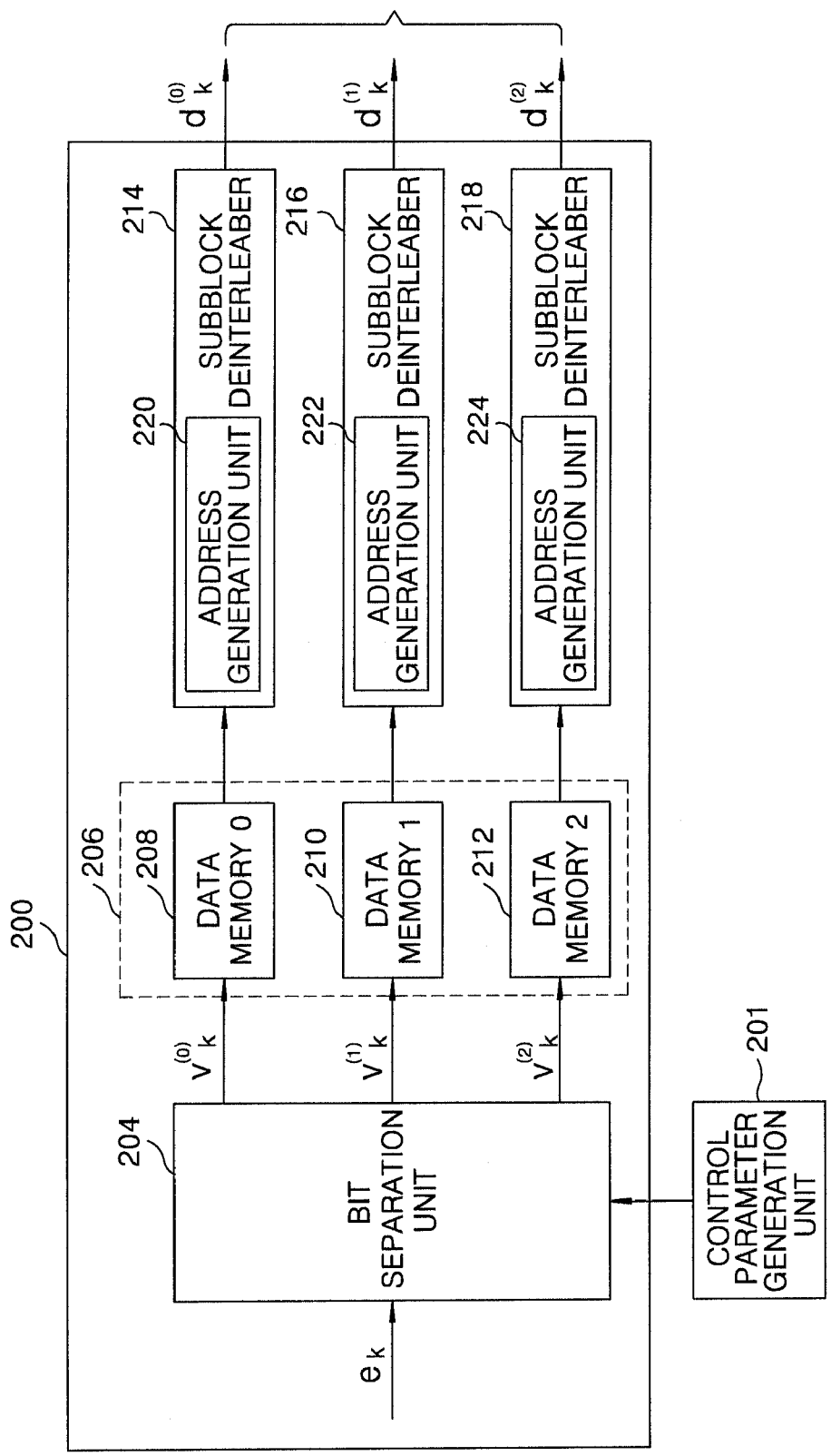
FIG. 2 illustrates a block diagram of a derate matcher for turbo coded data in accordance with an embodiment of the present invention.

FIG. 2 illustrates a detailed block diagram of a derate matcher in accordance with an embodiment of the present invention. As illustrated therein, the derate matcher 200 includes a control parameter generation unit 201 for generating control parameters to separate bits of an input bit stream $e_k$, a bit separation unit 204 for separating the bits of the input bit stream $e_k$ into three types of bit streams $v^{(0)}k$, $v^{(1)}k$, and $v^{(2)}k$ by modulus operation of each of the bits of the input bit stream and the control parameters, address generators 220, 222, and 224 for generating addresses (j) of valid data to be used in a deinterleaver for each of the bit stream data $v^{(0)}k$, $v^{(1)}k$, and $v^{(2)}k$ output from the bit separation unit 204, a buffer unit 206 for separating the respective bit stream data $v^{(0)}k$, $v^{(1)}k$, and $v^{(2)}k$ to store same output from the bit separation unit 204, and subblock deinterleavers 214, 216, and 218 for sequentially inputting data corresponding to the addresses generated by the address generators 220, 222, and 224 to output decoded data.

Hereinafter, the operation of each component in the derate matcher 200 in accordance with the present invention will be described in detail with reference to FIG. 2.

First, the bit separation unit 204 performs bit separation on an input bit stream $e_k$ having E bits input to the derate matcher 200.

In accordance with the embodiment of the present invention, in the bit separation process of the bit separation unit 204, the number of dummy bits is not calculated, but a bit stream having E bits is bit-separated to provide separated bit streams $v^{(0)}k$, $v^{(1)}k$, and $v^{(2)}k$, each having D bits, and then deinterleaved by the subblock deinterleavers 214, 216, and 218 to output $d^{(0)}k$, $d^{(1)}k$, and $d^{(2)}k$, respectively. That is, the dummy bits are considered by the subblock deinterleavers 214, 216, and 218, and thus, no additional data bit processing time is required for processing the dummy bits.

The bit separation unit 204 performs bit separation using Kstart and Kswitch inputted from the control parameter generation unit 201.

The number $N_D$ of dummy bits used in the turbo coding rate matcher of the 3GPP LTE system has one of {4, 12, 20, 28} and the redundancy version number rv value has one of {0, 1, 2, 3}. Therefore, the control parameter generation unit 201 generates parameter values Kstart and Kswitch based on the dummy bit number $N_D$ and the redundancy version number rv value, as in Tables 2 and 3 below, and then provides them to the bit separation unit 204. Here, R used in Tables 2 and 3 indicates a row value of the subblock deinterleavers 214, 216, and 218.

TABLE 2

| $N_D$ | rv | | | |
|---|---|---|---|---|
| | 0 | 1 | 2 | 3 |
| 4 | 2R-1 | 26R-4 | 50R-8 | 74R-10 |
| 12 | 2R-1 | 26R-10 | 50R-20 | 74R-30 |
| 20 | 2R-2 | 26R-17 | 50R-32 | 74R-48 |
| 28 | 2R-2 | 26R-23 | 50R-44 | 74R-66 |

TABLE 3

| $N_D$ | Kswitch |
|---|---|
| 4 | 3D-16R+2 |
| 12 | 3D-12R+4 |
| 20 | 3D-14R+8 |
| 28 | 3D-10R+8 |

Figure 3:
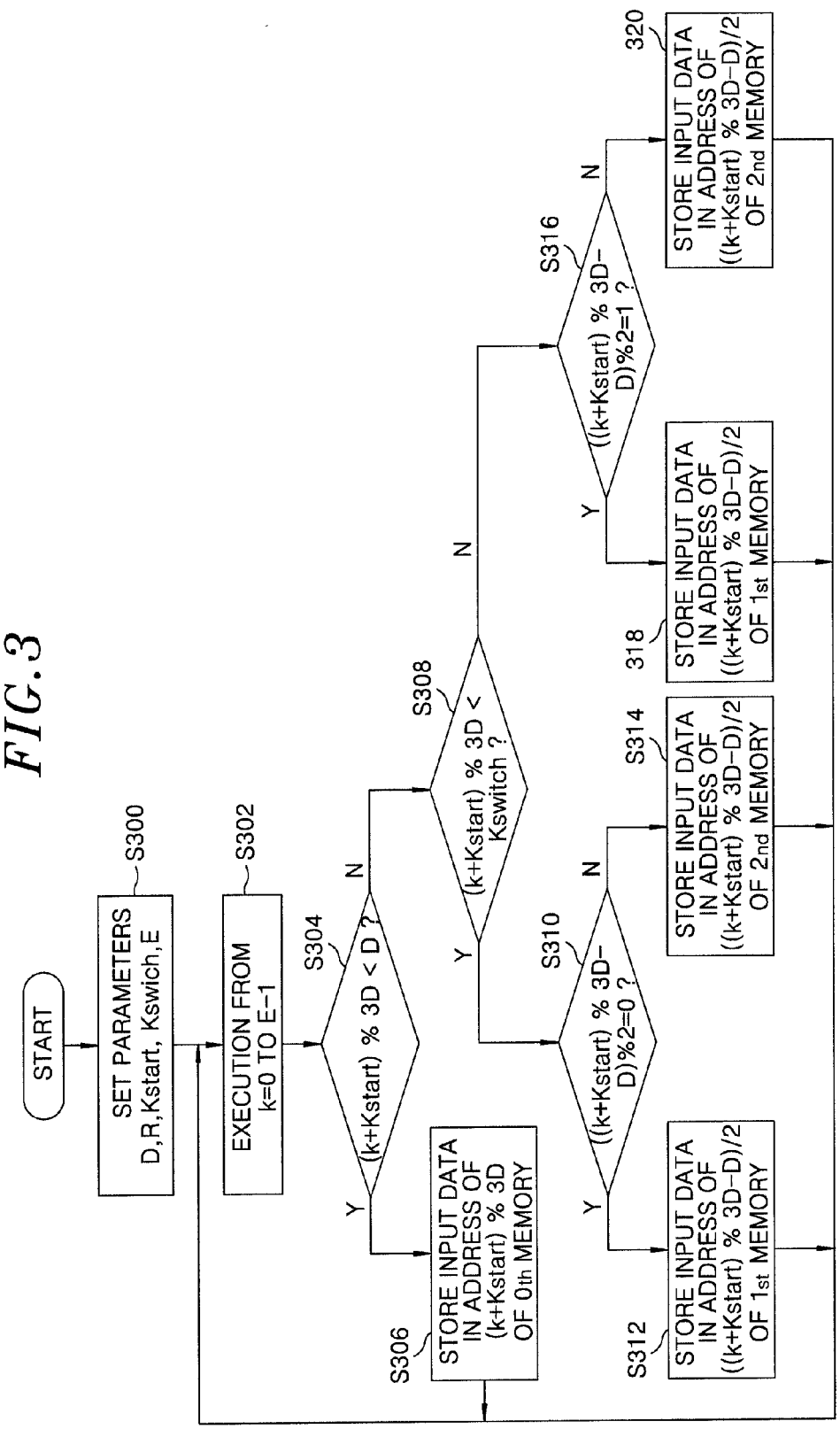
FIG. 3 provides a flow chart for controlling the operation of bit separation in the derate matcher in accordance with the embodiment of the present invention.

FIG. 3 illustrates an operation control flow for separating the input bit stream by the bit separation unit 204 in accordance with the embodiment of the present invention.

Referring to FIG. 3, the bit separation unit 204 receives parameter values, such as the number D of data bits in each bit stream, a row value R of the subblock deinterleavers 214, 216, and 218, Kstart and Kswitch values provided by the control parameter generation unit 201, a number E of data bits in an input bit stream, and the like, sets parameters for bit separation in step S300, and performs a bit separation process on the input bit stream $e_k$ from k=0 to E−1 in step S302.

That is, if the setting of the parameters has been completed in this manner, the bit separation unit 204 first compares a (k+Kstart)% 3D value with a D value in step S304. If the (k+Kstart)% 3D value is less than the D value, the bit separation unit 204 stores the input data $e_k$ in an address of (k+Kstart)% 3D of a 0th data memory 208 within the buffer unit 206 in step S306. Here, the operator '%' indicates a modulus operation.

However, if the (k+Kstart)% 3D value is greater than or equal to the D value, the bit separation unit 204 proceeds to step S308 from step S304, which compares the (k+Kstart)% 3D value with a Kswitch value. If the (k+Kstart)% 3D value is less than the Kswitch value, a control process goes to step S310, and, if the (k+Kstart)% 3D value is greater than or equal to the Kswitch value, the control process goes to step S316.

As described above, if the (k+Kstart)% 3D value is less than the Kswitch value, the bit separation unit 204 checks whether a ((k+Kstart)% 3D−D)%2 value is 0 or 1 in step S310. If the ((k+Kstart)% 3D−D)%2 value is 0, the bit separation unit 204 stores the input data $e_k$ in an address of ((k+Kstart)% 3D−D)/2 of a 1st data memory 210 within the buffer unit 206 in step S312.

However, if the ((k+Kstart)% 3D−D)%2 value is 1, the bit separation unit 204 stores the input data $e_k$ in the address of ((k+Kstart)% 3D−D)/2 of a 2nd data memory 212 within the buffer unit 206 in step S314.

On the other hand, as a result of comparison in step S308, if the (k+Kstart)% 3D value is greater than or equal to the Kswitch value, the bit separation unit 204 proceeds to step S316 to check whether the ((k+Kstart)% 3D−D)%2 value is 0 or 1. As a result of checking, if the ((k+Kstart)% 3D−D)%2 value is 1, the control process goes to step S318 and the bit separation unit 204 stores the input data $e_k$ in an address of ((k+Kstart)% 3D−D)/2 of the 1st data memory 210 within the buffer unit 206.

However, otherwise, if the ((k+Kstart)% 3D−D)%2 value is 0, the control process goes to step S320 and the bit separation unit 204 stores the input data $e_k$ in the address of ((k+Kstart)% 3D−D)/2 of the 2nd data memory 212 within the buffer unit 206.

By such bit separation as shown in FIG. 3, the data of the input bit stream $e_k$ is separated into three types of data $v^{(0)}k$, $v^{(1)}k$, and $v^{(2)}k$ and then stored in the 0th to 2nd data memories 208, 210, and 210 within the buffer unit 206, respectively.

Then, the subblock deinterleavers 214, 216, and 218 generate addresses (j) of valid data to be used in a deinterleaver for each bit stream data outputted from the bit separation unit 204 by using the address generators 220, 222, and 224 implemented therein, and then sequentially read out data corresponding to the addresses generated by the address generation units 220, 222, and 224 from the data stored in the corresponding 0th to 2nd data memories 208, 210, and 212 within the buffer unit 206 to output the data which is sequentially read out as decoded data, thereby simply completing the deinterleaving operation.

Hereinafter, the deinterleaving operation of the data stored in the buffer unit 206, which is executed by the subblock deinterleavers 214, 216, and 218 will be described in detail.

The subblock deinterleavers 214, 216, and 218 deinterleave the bit stream data $v^{(0)}k$, $v^{(1)}k$, and $v^{(2)}k$, each having D bits, stored in the 0th to 2nd data memories 208, 210 and 212, respectively, to output $d^{(0)}k$, $d^{(1)}k$, and $d^{(2)}k$, each having D bits, by following equations.

First, for i=0 and 1, $d^{(i)}k=v^{(i)}k$ where the output after the bit separation is in the form of a bit stream and k=0 to D−1. For $N_D$=4, 12, 20, and 28, $N_{D\_idx}$ is 0, 1, 2, and 3, respectively. In this condition, the addresses (j) are generated by the address generators 220, 222, and 224 as follows:

$$j = R * P1[k + N_D)\%32] + \left[\frac{k+N_D}{32}\right] - \text{Deint\_Perm1}[N_{D\_idx}][k\%32] \quad \text{[Equation 5]}$$

wherein $N_D=(R_{subblock} \times C_{subblock}-D)$, R is a row value of the subblock deinterleavers 214, 216, and 218, and a%b indicates a residue obtained by dividing a by b. Further, P1[32]={0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31}.

Deint_Perm1[4][32]={1, 3, 2, 4, 1, 3, 2, 4, 1, 3, 2, 4, 1, 3, 2, 4, 1, 3, 2, 4, 1, 3, 2, 4, 1, 3, 2, 4, 1, 3, 2, 4, 3, 9, 6, 12, 1, 7, 4, 10, 3, 9, 6, 12, 2, 8, 5, 11, 3, 9, 6, 12, 1, 7, 4, 10, 3, 9, 6, 12, 2, 8, 5, 11, 4, 14, 9, 19, 3, 13, 8, 18, 5, 15, 10, 20, 1, 11, 6, 16, 4, 14, 9, 19, 3, 13, 8, 18, 5, 15, 10, 20, 2, 12, 7, 17, 7, 21, 14, 28, 1, 15, 8, 22, 5, 19, 12, 26, 3, 17, 10, 24, 7, 21, 14, 28, 2, 16, 9, 23, 6, 20, 13, 27, 4, 18, 11, 25}

Next, for i=2, $d^{(i)}k=v^{(i)}k$ where the output after the bit separation is in the form of a bit stream and k=0 to D-1. For $N_D$=4, 12, 20, and 28, $N_{D\_idx}$ is 0, 1, 2, and 3, respectively. In this condition, the addresses (j) generated by the address generation units 220, 222, and 224 are obtained as follows:

$$j = R * P1[k + N_D - 1)\%32] + \left[\frac{k+N_D-1}{32}\right] - \text{Deint\_Perm2}[N_{D\_idx}][k\%32] \quad \text{[Equation 6]}$$

wherein $N_D=(R_{subblock} \times C_{subblock}-D)$, and R is a row value of the subblock deinterleavers 214, 216. Further, P1 [32]={0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31}.

Deint_Perm1[4][32]={3, 1, 3, 2, 3, 1, 3, 2, 3, 1, 3, 2, 3, 1, 3, 2, 3, 1, 3, 2, 3, 1, 3, 2, 3, 1, 3, 2, 3, 1, 3, 2, 10, 3, 9, 6, 11, 1, 7, 4, 10, 3, 9, 6, 11, 2, 8, 5, 10, 3, 9, 6, 11, 1, 7, 4, 10, 3, 9, 6, 11, 2, 8, 5, 16, 4, 14, 9, 18, 3, 13, 8, 17, 5, 15, 10, 19, 1, 11, 6, 16, 4, 14, 9, 18, 3, 13, 8, 17, 5, 15, 10, 19, 2, 12, 7, 24, 7, 21, 14, 27, 1, 15, 8, 22, 5, 19, 12, 25, 3, 17, 10, 24, 7, 21, 14, 27, 2, 16, 9, 23, 6, 20, 13, 26, 4, 18, 11}

As described above, in the derate matcher and method for processing data that is turbo coded and transmitted in the 3GPP LTE and LTE Advance systems, the present invention performs signal processing on a redundancy version number rv, resulting from the transmission of the dummy bits and HARQ created by the subblock interleavers based on the length of transmitted data, by a bit separation process using the memory address generators by having the parameters simplified by the decoder of the receiving end, and implements subblock deinterleavers to perform decoding without passing through the complex deinterleaving process, thereby reducing hardware processing time taken by the derate matcher of the receiving end and simplifying hardware implementation and control signal structure.

While the invention has been shown and described with respect to the embodiments, it will be understood by those skilled in the art that various changes and modifications may be made without departing from the scope of the invention as defined in the following claims.

What is claimed is:

1. A data derate matcher for supporting hybrid automatic repeat request (HARQ), comprising:
   a control parameter generation unit for generating control parameters to separate bits of an input bit stream $e_k$;
   a bit separation unit for separating the bits of the input bit stream $e_k$ into three types of bits streams $v^{(0)}k$, $v^{(1)}k$, and $v^{(2)}k$ by modulus operation of each of the bits of the input bit stream and the control parameters;
   address generators for generating addresses (j) of valid data to be used in deinterleavers with respect to data of each of the bit streams output from the bit separation unit; and
   subblock deinterleavers for sequentially inputting data corresponding to the addresses generated by the address generators to output decoded data.

2. The data derate matcher of claim 1, wherein, for the bit stream data of $v^{(0)}k$ and $v^{(1)}k$, the address generators generate addresses (j) to specify the respective bit stream data using the following equation:

$$j = R * P1[k + N_D)\%32] + \left[\frac{k+N_D}{32}\right] - \text{Deint\_Perm1}[N_{D\_idx}][k\%32]$$

herein R is a row value of the subblock deinterleavers; $N_D$ is a number of dummy bits; $N_{D\_idx}$ is an index value of $N_D$; P1 is a matrix value obtained by performing matrix operation on the dummy bits; D is a number of data bits in each bit stream; k is a natural number ranging from 1 to D-1; and Deint_Perm1 is a matrix value obtained by combining the dummy bits with the row value by matrix operation.

3. The data derate matcher of claim 2, wherein the matrix value of P1[32] for a dummy bit number of 32 is {0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31}.

4. The data derate matcher of claim 2, wherein the matrix value of Deint_Perm1[4][32] for a row value of 4 and a dummy bit number of 32 is {1, 3, 2, 4, 1, 3, 2, 4, 1, 3, 2, 4, 1, 3, 2, 4, 1, 3, 2, 4, 1, 3, 2, 4, 1, 3, 2, 4, 1, 3, 2, 4, 3, 9, 6, 12, 1, 7, 4, 10, 3, 9, 6, 12, 2, 8, 5, 11, 3, 9, 6, 12, 1, 7, 4, 10, 3, 9, 6, 12, 2, 8, 5, 11, 4, 14, 9, 19, 3, 13, 8, 18, 5, 15, 10, 20, 1, 11, 6, 16, 4, 14, 9, 19, 3, 13, 8, 18, 5, 15, 10, 20, 2, 12, 7, 17, 7, 21, 14, 28, 1, 15, 8, 22, 5, 19, 12, 26, 3, 17, 10, 24, 7, 21, 14, 28, 2, 16, 9, 23, 6, 20, 13, 27, 4, 18, 11, 25}.

5. The data derate matcher of claim 1, wherein, for the bit stream data of $v^{(2)}k$, the corresponding address generator generates an address (j) to specify the bit stream data using the following equation:

$$j = R * P1[k + N_D - 1)\%32] + \left[\frac{k+N_D-1}{32}\right] - \text{Deint\_Perm2}[N_{D\_idx}][k\%32]$$

herein R is a row value of the subblock deinterleavers; $N_D$ is a number of dummy bits; $N_{D\_idx}$ is an index value of $N_D$; P1 is a matrix value obtained by performing matrix operation on the dummy bits; D is a number of data bits in each bit stream; k is a natural number ranging from 1 to D-1; and Deint_Perm1 is a matrix value obtained by combining the dummy bits with the row value by matrix operation.

6. The data derate matcher of claim 5, wherein the matrix value of P1[32] for a dummy bit number of 32 is {0, 16, 8, 24, 4, 20, 12, 20, 12, 28, 2, 18, 10, 26, 6, 22, 14, 30, 1, 17, 9, 25, 5, 21, 13, 29, 3, 19, 11, 27, 7, 23, 15, 31}.

7. The data derate matcher of claim 5, wherein the matrix value of Deint_Perm1[4][32] for a row value of 4 and a dummy bit number of 32 is {3, 1, 3, 2, 3, 1, 3, 2, 3, 1, 3, 2, 3, 1, 3, 2, 3, 1, 3, 2, 3, 1, 3, 2, 3, 1, 3, 2, 3, 1, 3, 2, 10, 3, 9, 6, 11, 1, 7, 4, 10, 3, 9, 6, 11, 2, 8, 5, 10, 3, 9, 6, 11, 1, 7, 4, 10, 3, 9, 6, 11, 2, 8, 5, 16, 4, 14, 9, 18, 3, 13, 8, 17, 5, 15, 10, 19, 1, 11, 6, 16, 4, 14, 9, 18, 3, 13, 8, 17, 5, 15, 10, 19, 2, 12, 7, 24, 7, 21, 14, 27, 1, 15, 8, 22, 5, 19, 12, 25, 3, 17, 10, 24, 7, 21, 14, 27, 2, 16, 9, 23, 6, 20, 13, 26, 4, 18, 11}.

8. The data derate matcher of claim 1, further including a buffer unit for storing each bit stream data output from the bit separation unit, the buffer unit being connected between the subblock deinterleavers and the bit separation unit.

9. The data derate matcher of claim 1, wherein the control parameter generation unit generates the control parameters including Kstart specifying a start position of the input bit stream and Kswitch specifying a switching point of the input bit stream.

10. The data derate matcher of claim 9, wherein, if the dummy bit number $N_D$ of the input bit stream has one of (4, 12, 20, 28) and a redundancy version (rv) value has one of (0, 1, 2, 3), the Kstart supports HARQ set in the following table:

| | rv | | | |
|---|---|---|---|---|
| $N_D$ | 0 | 1 | 2 | 3 |
| 4 | 2R-1 | 26R-4 | 50R-8 | 74R-10 |
| 12 | 2R-1 | 26R-10 | 50R-20 | 74R-30 |
| 20 | 2R-2 | 26R-17 | 50R-32 | 74R-48 |
| 28 | 2R-2 | 26R-23 | 50R-44 | 74R-66 | where R is a row value of the subblock deinterleavers and D is a number of data bits in each bit stream.

11. The data derate matcher of claim 9, wherein, if the dummy bit number $N_D$ of the input bit stream has one of (4, 12, 20, 28), the Kswitch supports HARQ set in the following table:

| $N_D$ | Kswitch |
|---|---|
| 4 | 3D-16R+2 |
| 12 | 3D-12R+4 |
| 20 | 3D-14R+8 |
| 28 | 3D-10R+8 | where R is a row value of the subblock deinterleavers and D is a number of data bits in each bit stream.

12. The data derate matcher of claim 1, wherein the dummy bit number included in the input bit stream supports HARQ set as one of 4, 12, 20, and 28.

13. The data derate matcher of claim 1, wherein the input bit stream supports HARQ that is turbo coded data.

14. A data derate matching method in a data derate matcher for supporting hybrid automatic repeat request (HARQ), comprising:
    generating control parameters to separate bits of an input bit stream $e_k$;
    separating the bits of the input bit stream $e_k$ into three types of bits streams $v^{(0)}k$, $v^{(1)}k$, and $v^{(2)}k$ by modulus operation of each of the bits of the input bit stream and the control parameters;
    generating addresses (j) of valid data to be used in deinterleavers with respect to data of each of the separated bit streams $v^{(0)}k$, $v^{(1)}k$, and $v^{(2)}k$; and
    sequentially inputting data corresponding to the generated addresses among the respective bit stream data to output decoded data.

15. The data derate matching method of claim 14, wherein, for the bit stream data of $v^{(0)}k$ and $v^{(1)}k$, said generating addresses (j) generates addresses (j) to specify the respective bit stream data using the following equation:

$$j = R * P1[k + N_D)\%32] + \left[\frac{k + N_D}{32}\right] - \text{Deint\_Perm1}[N_{D\_idx}][k\%32]$$

wherein R is a row value of the subblock deinterleavers; $N_D$ is a number of dummy bits; $N_{D\_idx}$ is an index value of $N_D$; P1 is a matrix value obtained by performing matrix operation on the dummy bits; D is a number of data bits in each bit stream; k is a natural number ranging from 1 to D−1; and Deint_Perm1 is a matrix value obtained by combining the dummy bits with the row value by matrix operation.

16. The data derate matching method of claim 14, wherein, for the bit stream data of $v^{(2)}k$, said generating addresses (j) generates an address (j) to specify the bit stream data using the following equation:

$$j = R * P1[k + N_D - 1)\%32] + \left[\frac{k + N_D - 1}{32}\right] - \text{Deint\_Perm2}[N_{D\_idx}][k\%32]$$

wherein R is a row value of the subblock deinterleavers; $N_D$ is a number of dummy bits; $N_{D\_idx}$ is an index value of $N_D$; P1 is a matrix value obtained by performing matrix operation on the dummy bits; D is a number of data bits in each bit stream; k is a natural number ranging from 1 to D−1; and Deint_Perm1 is a matrix value obtained by combining the dummy bits with the row value by matrix operation.

17. The data derate matching method of claim 14, wherein the control parameters include Kstart specifying a start position of the input bit stream and Kswitch specifying a switching point of the input bit stream.

18. The data derate matching method of claim 17, wherein, if the dummy bit number $N_D$ of the input bit stream has one of (4, 12, 20, 28) and a redundancy version (rv) value has one of (0, 1, 2, 3), the Kstart supports HARQ set in the following table:

| | rv | | | |
|---|---|---|---|---|
| $N_D$ | 0 | 1 | 2 | 3 |
| 4 | 2R-1 | 26R-4 | 50R-8 | 74R-10 |
| 12 | 2R-1 | 26R-10 | 50R-20 | 74R-30 |
| 20 | 2R-2 | 26R-17 | 50R-32 | 74R-48 |
| 28 | 2R-2 | 26R-23 | 50R-44 | 74R-66 | where R is a row value of the subblock deinterleavers and D is a number of data bits in each bit stream.

19. The data derate matching method of claim 17, wherein, if the dummy bit number $N_D$ of the input bit stream has one of (4, 12, 20, 28), the Kswitch supports HARQ set in the following table:

| $N_D$ | Kswitch |
|---|---|
| 4 | 3D-16R+2 |
| 12 | 3D-12R+4 |
| 20 | 3D-14R+8 |
| 28 | 3D-10R+8 | where R is a row value of the subblock deinterleavers and D is a number of data bits in each bit stream.

20. The data derate matching method of claim 14, wherein the input bit stream is turbo coded data.

* * * * *